(12) United States Patent
Ashwood-Smith et al.

(10) Patent No.: US 12,432,108 B2
(45) Date of Patent: *Sep. 30, 2025

(54) METHOD AND APPARATUS FOR CORE NETWORK RESPONSE TO PREDICTABLE SATELLITE BACKHAUL OUTAGES

(71) Applicant: HUAWEI TECHNOLOGIES CO., LTD., Shenzhen (CN)

(72) Inventors: Peter Ashwood-Smith, Gatineau (CA); Mehdi Arashmid Akhavain Mohammadi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 642 days.

This patent is subject to a terminal disclaimer.

(21) Appl. No.: 17/531,236

(22) Filed: Nov. 19, 2021

(65) Prior Publication Data

US 2023/0164024 A1 May 25, 2023

(51) Int. Cl.
*H04L 41/0659* (2022.01)
*H04L 43/0817* (2022.01)
*H04W 24/04* (2009.01)

(52) U.S. Cl.
CPC ...... *H04L 41/0659* (2013.01); *H04L 43/0817* (2013.01); *H04W 24/04* (2013.01)

(58) Field of Classification Search
CPC ............ H04L 41/0659; H04L 43/0817; H04L 41/0895; H04L 41/122; H04L 43/0876; H04L 43/20; H04L 41/0668; H04L 41/0816; H04L 41/0836; H04L 41/0897; H04L 41/147; H04W 24/04
See application file for complete search history.

(56) References Cited

U.S. PATENT DOCUMENTS 4,983,980 A 1/1991 Ando
5,574,969 A 11/1996 Olds
(Continued)

FOREIGN PATENT DOCUMENTS

CN 1142736 A 2/1997
CN 112715053 A 4/2021
(Continued)

OTHER PUBLICATIONS

OPPO:"Discussion on the support of discontinuous coverage for IoT over NTN." 3GPP TSG-RAN WG2 Meeting #116 electronic R2-2109504 Online, Nov. 1-12, 2021.

*Primary Examiner* — Habte Mered

(57) ABSTRACT

For a communication network using a satellite-involved backhaul, the backhaul outage and restoration states are predicted based on satellite motion data. Based on such predictions, devices providing the core portion of the communication network, and nearby Internet or backhaul radio devices can schedule or take actions. Actions can include but are not necessarily limited to: powering equipment up or down, suspending communications, migrating software from servers being powered down, transmitting replies to packets to indicate an anticipated outage and optionally anticipated outage end time, marking packets with congestion indications, closing or reopening certain ports, withdrawing or reinstating routing table addresses, and transmitting outage notifications to users or devices.

20 Claims, 12 Drawing Sheets

(56) References Cited

U.S. PATENT DOCUMENTS

| | | | |
|---|---|---|---|
| 6,070,073 A | 5/2000 | Maveddat et al. | |
| 6,169,881 B1 | 1/2001 | Astrom et al. | |
| 6,185,409 B1 | 2/2001 | Threadgill et al. | |
| 8,254,943 B1 * | 8/2012 | Dinan | H04W 76/19 |
| | | | 455/454 |
| 12,035,170 B2 * | 7/2024 | Xenakis | H04W 28/0247 |
| 2012/0299702 A1 | 11/2012 | Edara | |
| 2013/0310025 A1 * | 11/2013 | Black | H04W 24/04 |
| | | | 455/423 |
| 2014/0022900 A1 * | 1/2014 | Salot | H04W 28/0284 |
| | | | 370/235 |
| 2014/0187236 A1 * | 7/2014 | Chiang | H04W 24/04 |
| | | | 455/423 |
| 2017/0048109 A1 * | 2/2017 | Kant | H04L 41/0836 |
| 2019/0137614 A1 | 5/2019 | Calmettes et al. | |
| 2019/0335345 A1 * | 10/2019 | Yan | H04W 16/18 |
| 2020/0267596 A1 * | 8/2020 | Sudarsan | H04W 72/52 |
| 2021/0399797 A1 * | 12/2021 | Khan | H04W 36/085 |
| 2022/0030657 A1 * | 1/2022 | Yamine | H04W 24/04 |
| 2022/0052753 A1 * | 2/2022 | Speidel | H04B 7/18513 |
| 2022/0095194 A1 * | 3/2022 | Sheng | H04W 76/19 |
| 2022/0110179 A1 * | 4/2022 | Sheng | B65D 5/241 |
| 2022/0163677 A1 | 5/2022 | Muthuraman et al. | |
| 2023/0062393 A1 * | 3/2023 | Khan | G06N 20/00 |
| 2023/0370858 A1 * | 11/2023 | Kotagiri | H04W 16/18 |
| 2024/0119369 A1 * | 4/2024 | Cyras | G06N 3/08 |

FOREIGN PATENT DOCUMENTS

| | | |
|---|---|---|
| CN | 112789908 A | 5/2021 |
| CN | 113056877 A | 6/2021 |
| CN | 113169795 A | 7/2021 |
| WO | 2020124076 A1 | 6/2020 |

* cited by examiner

METHOD AND APPARATUS FOR CORE NETWORK RESPONSE TO PREDICTABLE SATELLITE BACKHAUL OUTAGES

CROSS-REFERENCE TO RELATED APPLICATIONS

This is the first application filed for this invention.

FIELD OF THE INVENTION

This disclosure pertains generally to the field of wireless communications and in particular to operations by core network devices, and devices connected to a core network, in which the core network uses a satellite backhaul to connect to a corresponding radio access network.

BACKGROUND OF THE INVENTION

Communication networks distributed over a large geographic area can include a central core component providing core network functionalities and one or more remote components each providing localized network access via wireless communication. The remote component is often referred to as a radio access portion of the network and may include a fronthaul network which connects component devices together. End devices, such as wireless user equipment devices, can wirelessly communicate with devices in the radio access portion. The radio access portion often acts as an intermediary, communicating over a backhaul link with the core portion to enable communication between the end device and the core portion, and potentially to other devices via the core portion.

To cover large geographic areas, the backhaul link can be provided partially or fully using a satellite communication link. A satellite, such as a low earth orbit satellite, or a network involving one or more low earth orbit satellites, can be used to provide such a backhaul link. However, except for satellites in geostationary orbit (which may not be good candidates for providing backhaul links due for example to propagation delays), satellites move with respect to the ground. This can lead to satellites moving out of range of the network central (core) component or remote (radio access) component, resulting in a backhaul outage. Even with a network of satellites which sequentially cover a given area, some outages are to be expected in realistic implementations. It is therefore necessary to develop solutions for handling such backhaul outages in a way that mitigates operation problems or user experience problems.

Therefore, there is a need for a method and apparatus for operating devices in or coupled to a core network, the core network connected to a radio access network via a backhaul involving satellite communication links, that obviates or mitigates one or more limitations in the prior art.

This background information is intended to provide information that may be of possible relevance to the present invention. No admission is necessarily intended, nor should be construed, that any of the preceding information constitutes prior art against the present invention.

SUMMARY OF THE INVENTION

Embodiments of the present disclosure generally provide for a method and apparatus for performing certain actions in response to a predicted future outage in a backhaul network involving a satellite communication link. The outage is due at least in part to the orbital position and state of a satellite providing part or all of the backhaul network. The state of the satellite can be active or non-active (e.g. failed). A satellite that is overhead and thus in a good orbital position can nevertheless be in a non-active state, thus causing an outage. Alternatively, it can be considered that a non-active satellite does not currently form part of the satellite network. However, for greater certainty the outage may be considered to depend on both orbital position and state. Because satellites follow regular orbits, such outages can be reliably predicted. A variety of actions can be taken in response to a predicted outage, such as actions which improve user experience for example by providing notifications, actions which conserve device power consumption, and actions which reduce communication operations that would be unproductive due to the outage. As subsequent restoration of the backhaul network can be similarly predicted, some embodiments provide for a method and apparatus for performing certain actions (e.g. reversing the actions listed above or elsewhere herein) in response to a (e.g. predicted) restoration of the backhaul network following an outage.

According to an embodiment of the present disclosure, there is provided a method for handling backhaul outages. The method includes determining a predicted future occurrence of an outage in a backhaul network. The outage is due to orbital position and state of satellites forming at least part of the backhaul network. The outage interrupts communication between a core portion of a communication network and a (remote) radio access portion of the communication network. The method includes, in response to determining the predicted future occurrence of the outage, scheduling or performing an action. The action may be an action at one or more of: a device belonging to the core portion of the communication network and communicating with the remote radio access portion; a device which facilitates communication between the core network and the remote radio access portion; and a device coupled to the core portion and providing access to the remote radio access portion via the core portion. The action may be performed at a time prior to a beginning of the outage.

According to an embodiment of the present disclosure, there is provided an apparatus comprising a computer processor, a memory and a communication interface and configured to handle backhaul outages. The apparatus is configured to determine a predicted future occurrence of an outage in a backhaul network. The outage is due to orbital position and state of satellites forming at least part of the backhaul network. The outage interrupts communication between a core portion of a communication network and a radio access portion of the communication network. The apparatus is configured, in response to determining the predicted future occurrence of the outage, to schedule or perform an action at one or more of: a device belonging to the core portion of the communication network, the device also communicating (directly or indirectly) with the remote radio access portion; a device which facilitates communication between the core network and the remote radio access portion; and a device coupled to the core portion (e.g. but residing in a different network) and providing access to the remote radio access portion via the core portion. The action may be performed at a time prior to a beginning of the outage.

In various embodiments, the action includes one or more of: proactively suspending communication operations in an orderly manner; powering down communication equipment of the core portion, such as equipment being used to communicate with the remote radio access portion; and moving virtual network functions from such equipment prior to powering down said communication equipment.

In some embodiments, the action includes, in response to receiving a packet to be transmitted via the backhaul communication link or a packet prompting a further communication action involving the backhaul communication link: transmitting a reply packet toward a device sending the packet. The reply packet is indicative that the backhaul communication link is unavailable and specifying a time at which the backhaul communication link is expected to be available. In some embodiments, the action includes, in response to receiving a packet to be transmitted via the backhaul communication link or a packet prompting a further communication action involving the backhaul communication link: marking the packet with a congestion indication. The congestion indication may include an indication of a time at which the backhaul communication link is expected to be unavailable, available again after being unavailable, or a combination thereof. The congestion indication may include an indication that the backhaul state is anticipated to be different at a specified future time, than it is at the present time, or than it is at a different specified future time.

In some embodiments, a device belonging to the core portion of the communication network is a network address translator (NAT) or a firewall, and the action includes closing one or more ports, such as TCP or UDP ports, of the device belonging to the core portion of the communication network, said ports mapping to destinations accessed via the backhaul communication link.

In some embodiments, the device is a router serving the core portion, and the action includes withdrawing one or more network addresses or subnets corresponding to destinations accessed via the backhaul communication link.

In some embodiments, the action includes transmitting a notification of the outage. The notification may be directed toward a user or toward a device accessing the remote radio access portion of the communication network via the core network. The notification may be produced at the time prior to the beginning of the outage and may indicate the time corresponding to the beginning of the outage.

Some embodiments further include determining a predicted end time of the outage. In response to this determining the predicted end time of the outage, such embodiments include scheduling or performing a further action at one or more of: the device belonging to the core portion of the communication network; the device which facilitates communication between the core network and the remote radio access portion; and the device coupled to the core portion. The further action may be performed at or in advance of the predicted end time of the outage.

In some embodiments, the further action includes one or more of: resuming suspended communication operations; powering up previously powered down equipment of the core portion; and powering up previously powered down other equipment of the core portion, where the other equipment is used to communicate with the remote radio access portion. In some embodiments, the further action includes one or more of: producing a notification of an end of the outage, the notification being directed toward a user or toward the device accessing the communication network; producing a notification of the predicted end time, the notification being directed toward the user or toward the device accessing the communication network; and transmitting a notification of an end of the outage, the notification being directed toward a user or toward a device accessing the remote radio access portion of the communication network via the core network. In some embodiments, the further action includes one or more of: reopening one or more previously closed ports of the device belonging to the core portion of the communication network, the device acting as a NAT or a firewall and said ports mapping to destinations accessed via the backhaul communication link; and reinstating, at the device acting as a router within or adjacent to the core portion, one or more previously withdrawn network addresses or subnets corresponding to destinations accessed via the backhaul communication link.

According to an embodiment of the present disclosure, there is provided a device, belonging to or serving (e.g. coupled to the core portion and providing access to the remote radio access portion via the core portion) a core portion of a communication network, which is configured as described above.

In various embodiments there is provided a computer program product comprising a computer readable medium. The computer readable medium stores thereon computer program instructions which, when executed, cause the computer to perform a method as described above or elsewhere herein. The computer may be a general-purpose computer or a specialized computing device.

Potential advantages of the present disclosure include reduced costs, improved spectral efficiency, improved energy efficiency, and improved user experience. Because satellite backhaul outages are better tolerated, satellite network requirements can be reduced, thus providing a cost and equipment savings. Because the outages are predicted and measures taken in anticipation of outage beginnings and ends, operation of the communication network and user experience can be improved. Because certain actions may be inhibited and certain equipment may be powered down, power usage and communication channel usage is reduced. This may improve power consumption costs or other costs.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

It will be noted that throughout the appended drawings, like features are identified by like reference numerals.

DETAILED DESCRIPTION OF THE INVENTION

In various implementations, a backhaul communication link is understood to refer to the communication interface between a radio access network (e.g. a 4G, 5G or 6G network as defined by the $3^{rd}$ Generation Partnership Project) and the core networking elements of a network. A backhaul communication link can be a single end-to-end communication link. More generally, a backhaul communication link can involve multiple devices networked together, in which case backhaul communications can be performed in a multi-hop manner or over a set of parallel links. For purposes of the present disclosure, a "backhaul network" is considered to include a pair of devices implementing a single backhaul communication link, or the single backhaul communication link itself, or a set of communication links, or associated devices in a multi-hop, parallel, or combination communication arrangement. The backhaul network can include one or more satellites, at least one (or two) of which communicates with a ground station. Two or more satellites may communicate with each other to implement the backhaul network. A backhaul can be regarded as a logical connection over a network (e.g. an IP network) between a radio access network and a core network. Generally speaking, a variety of technologies can be used to create an IP tunnel for supporting such a backhaul. For example, traditionally Ethernet, Ring networks, optical fiber and microwaves have been used for supporting backhauls.

Figure 1:
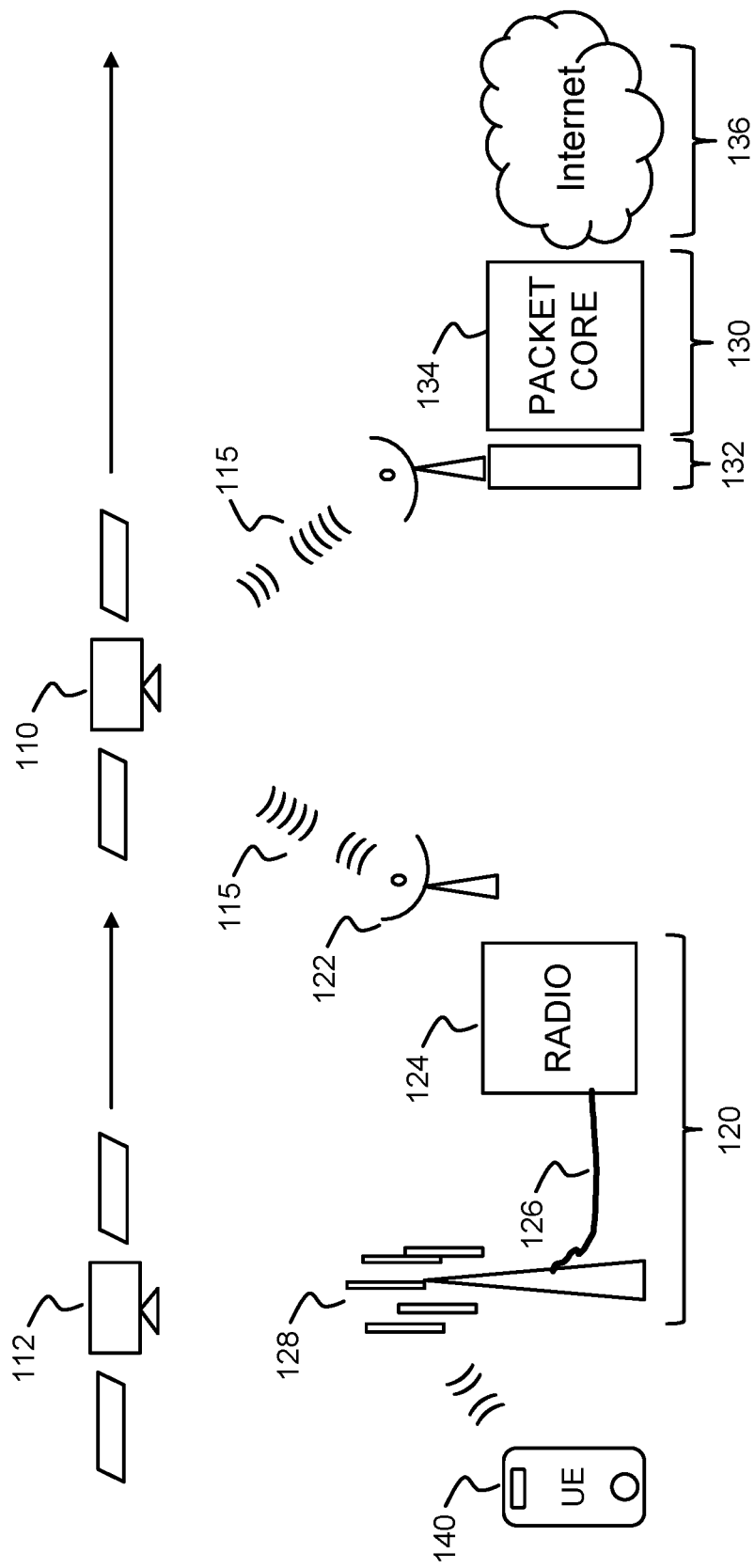
FIG. 1 illustrates a communication network supported by a satellite backhaul, according to an embodiment of the present disclosure.

An example of physical devices supporting backhauls is a satellite network, such as a single Low Earth Orbit (LEO) satellite or a network involving one, two or more of such LEO satellites. FIG. 1 illustrates an example of such a backhaul. According to FIG. 1, a LEO satellite 110 provides a backhaul link 115 between a ground station 122 associated with a radio access network 120 and a ground station 132 associated with a core network 130. As shown, only a single LEO satellite 110 is involved. However, more generally a backhaul network including at least one LEO satellite may be involved. For example, one LEO satellite 112 may communicate with the ground station 122 while another LEO satellite 110 may communicate with the ground station 132. The two LEO satellites 110, 112 may be directly or indirectly communicatively coupled together to form the backhaul network or a portion thereof.

The core network 130 includes a packet core 134, which may include various communication and computing devices as traditionally provided in a packet core network. The packet core 134 may be communicatively coupled to external networks, such as the Internet 136. The radio access network 120 may include a radio 124, a fronthaul link (or network) 126, and radio access equipment 128 such as radio access nodes, base stations, baseband units, remote radio heads, or components thereof, or the like, as are traditionally provided. Devices 140, such as user equipment (UE) devices, machine to machine devices (M2M or MTC), etc. wirelessly communicate with the radio access network 120, thus using the radio access network, for example to access the network as a whole, including the core network and beyond. A ground station 122 coupled to the radio access network communicates with a ground station 132 coupled to the core network via a backhaul communication link involving the satellite 110.

Figure 2:
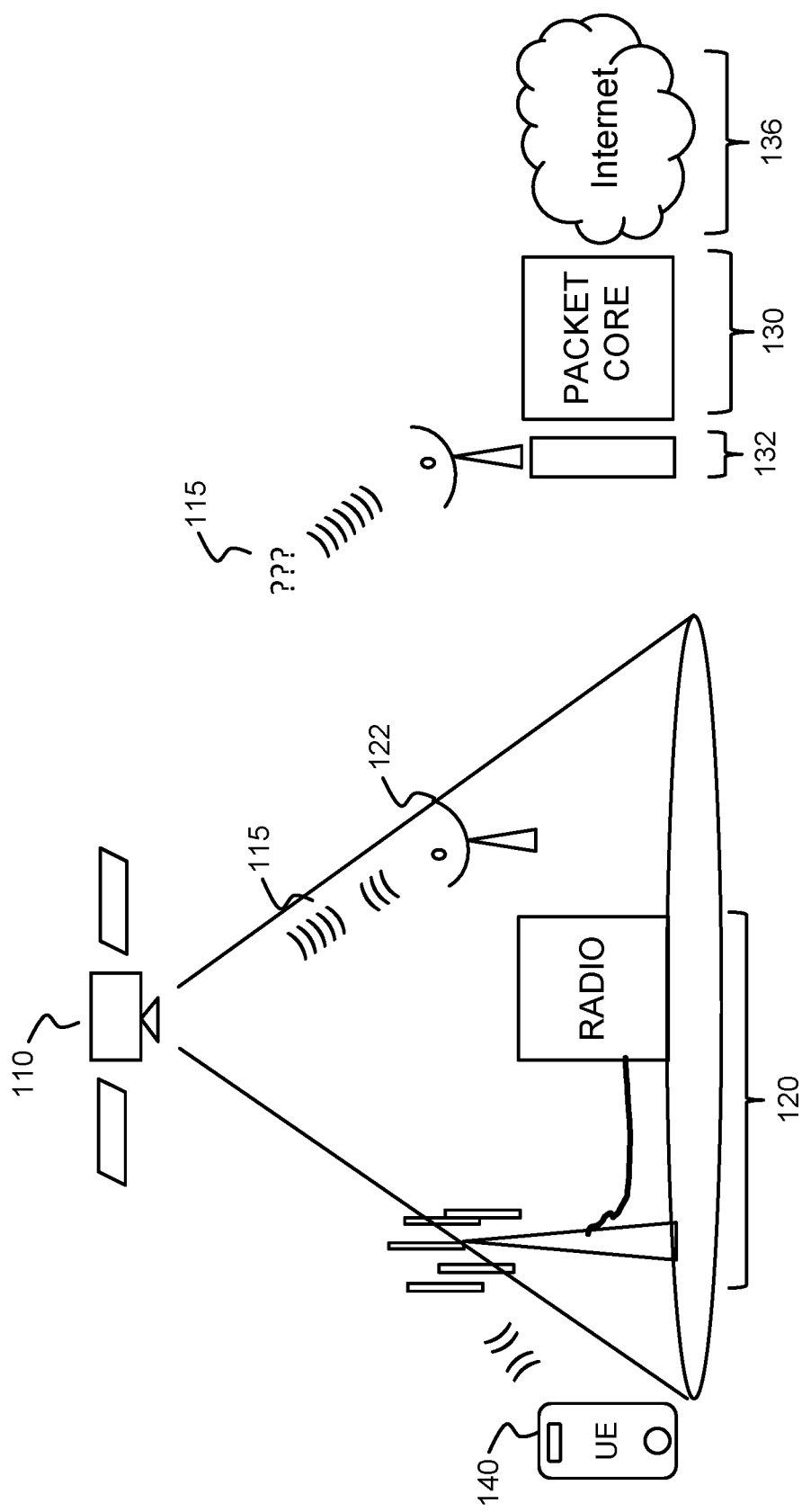
FIG. 2 illustrates a communication network supported by a satellite backhaul which is in an outage state, according to an embodiment of the present disclosure.

FIG. 2 illustrates an example configuration, similar to FIG. 1, but with the backhaul link 115 in an outage state. The LEO satellite 110 which previously communicated with both ground stations 122 and 132 has moved in its orbit to a location which is out of range (e.g. below the horizon) with respect to the ground station 132. Furthermore, it is assumed that no other LEO satellites or other links of the backhaul network are in a position to communicate with the ground station 132. Thus, communication between the radio access network 120 and the core network 130 is interrupted, and communication between the device 140 and the core network 130 and beyond is correspondingly interrupted.

Knowing the locations and orbits of satellites, such outage states, and subsequent restorations corresponding to the end of outage states, are generally predictable in advance. For example, given a constellation of satellites at known altitudes and with known directions of motion and known radio coverage characteristics, locations on the Earth for which no satellites are overhead in a position allowing for communication can be predicted using computer modeling. An example is a constellation of 1500 satellites in a 53 degree Walker Delta constellation arrangement, at an altitude of 550 km, and with phased antenna arrays directed directly downward and having a 45 degree conical radio coverage zone. As will be readily understood by a person skilled in the art, the 53 degrees is the angle the orbit makes relative to the equator, so satellites travel between 53 degrees north latitude and 53 degrees south latitude.

Outage predictions can be used to predict "holes" in coverage (i.e. areas without backhaul network service), as a function of geographic ground location and time. That is, for a particular latitude and longitude, predictions can be made of future times during which satellite backhaul outages are expected to occur, with respect to service of ground-based equipment. The outage can be regarded as an outage in a backhaul network, and is due to orbital positions and states of one or more satellites forming at least part of the backhaul network. Such an outage interrupts communication between the radio access (RAN) portion of the communication network and a core portion of the communication network. Cycles of outages are expected to repeat over time, because of the orbital nature of the satellites. Coverage holes may be due to satellite failures, chosen orbital topologies, reduced satellite deployments for budgetary reasons, or the like, or a combination thereof.

In some embodiments, backhaul state change predictions, such as outage predictions and subsequent backhaul non-outage (restoration) predictions can be performed by a computing device and communicated in advance to various other devices. In some embodiments, certain devices may make their own outage predictions, for example based on location and time information, which may be obtained from a global positioning system (GPS) module or other source. A prediction can indicate the time(s) at which the backhaul is in a given state (outage or non-outage) and when the transition between states occurs, i.e. the time boundaries of the state instances. It is noted that embodiments of the present disclosure can perform actions in response to a change in backhaul state, for example from non-outage to outage state, or from outage to non-outage state.

Embodiments of the present disclosure make or receive a set of outage predictions for satellite backhaul links, and subsequently, in response to such a prediction, schedule, perform, or both schedule and perform, one or more actions. The outage prediction can be a prediction of an outage in a backhaul link which interrupts communication between a core portion of a communication network (the "core network") and a remote radio access portion of the communication network (the RAN). Scheduling an action may correspond to instructing a device to perform an action at a specified future time, or scheduling a device (e.g. a manager device) to transmit an instruction at a specified future time. Such an instruction may be transmitted to another device and instructing that other device to perform an action, e.g. immediately upon receipt of the instruction.

Figure 3:
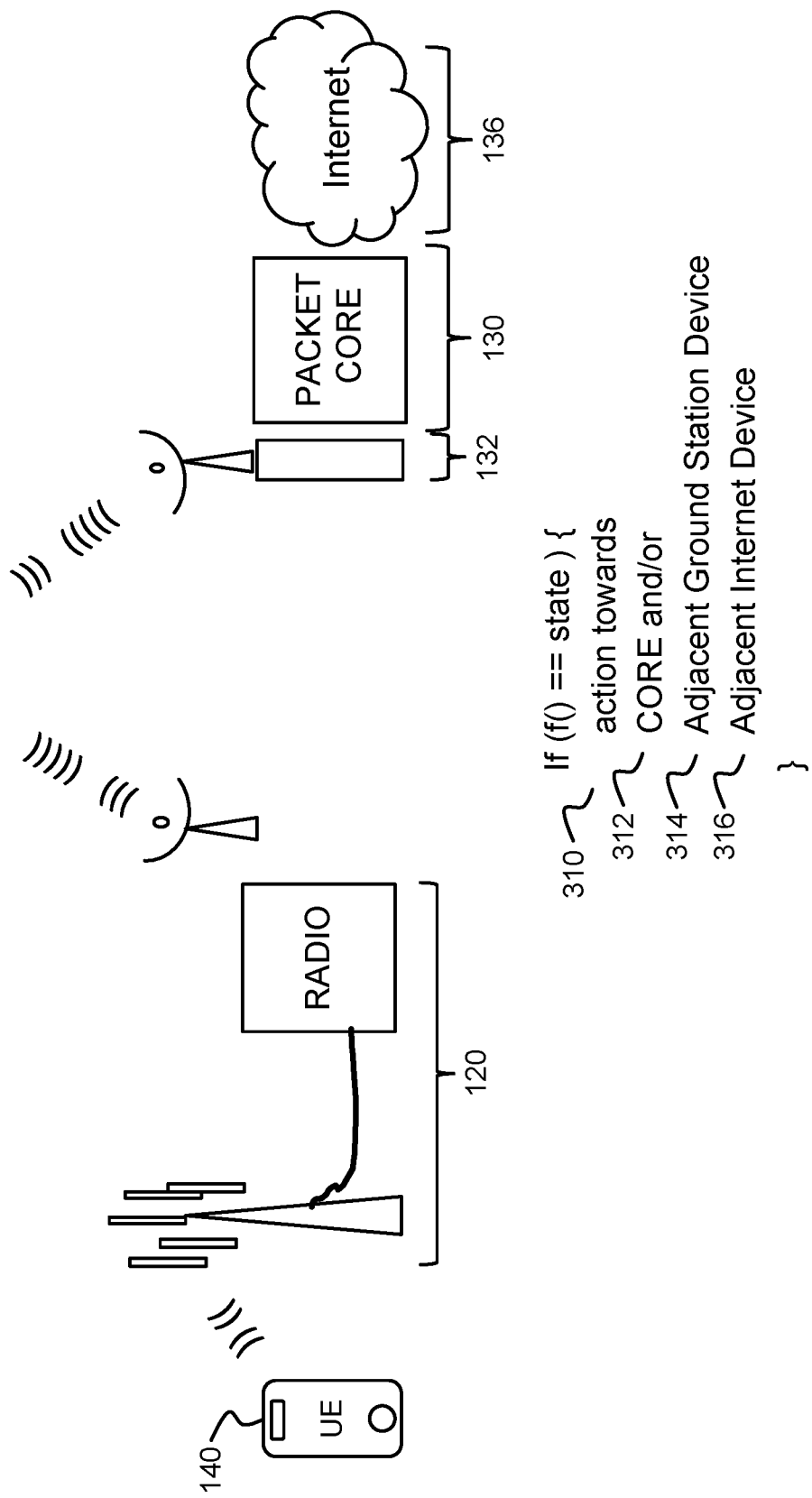
FIG. 3 illustrates a communication network taking an action toward a core network device or adjacent Internet device in response to a satellite backhaul state, according to an embodiment of the present disclosure.

As illustrated in FIG. 3, the actions can be scheduled or performed at a device belonging to the core network 130 where such a device communicates directly or indirectly with the remote radio access portion of the network which is linked to the core network via the backhaul link that is predicted to be in outage. Such a device may be a server, virtual machine hosted on a server, network function, NAT or firewall, or other device within a datacenter. The actions can be scheduled or performed at a device which facilitates communication between the core network and such a remote radio access portion of the network. This second type of device can be a ground station 132 or associated communication equipment, and further this second type of device can be a satellite backhaul radio or associated antenna equipment, for example. Additionally or alternatively, the actions can be scheduled or performed at a device which is coupled to (but not necessarily part of) the core network where such a device provides access to such a remote radio access portion of the network. This third type of device can be a router or other device in an adjacent network, such as the Internet 136.

Further with respect to FIG. 3, an action 310 is taken toward a core network device 312 or an adjacent ground station device 314 or an adjacent Internet-based device 316, or a combination thereof. The action is taken when the backhaul link is in a given state. The expression f( ) refers to a function which expresses, for a given time, whether the backhaul is in or is predicted to be in an outage state or non-outage state, either possibility being taken on by the variable "state." The state can be "down" to indicate that the backhaul is in an outage state or "up" to indicate that the backhaul is in a non-outage state. The action can be initiated by, performed by, or both initiated and performed by one of the devices 312, 314, 316. The action can be taken substantially at the time of, or in advance of, a change in state as expressed by f( ). An action can be taken by one device toward itself, or by that device toward another device or a user.

It is noted that a core network can be coupled to one or more remote radio access networks, each of which can be coupled to the core network via a satellite backhaul. In various embodiments, the present disclosure can be used to schedule and perform actions in response to a predicted outage for a backhaul that connects the core network to one or more of these remote radio access networks. Further, the present disclosure can be used to schedule and perform actions in response to predicted outages for each of a plurality of backhauls, each of which connects the core network to a corresponding one or more of these remote radio access networks. The actions can be actions which are specific to apparatuses or functions which communicate (with one or more remote radio access networks) via a backhaul link which is the subject of a specific outage prediction. In other words, if a core network communicates with multiple different radio access networks via multiple different respective backhaul links, embodiments of the present disclosure can be implemented concurrently for each of the different radio access networks and respective backhaul links.

The outage prediction can include a specified time in the future when an outage event is expected to occur. An action may be performed in response to the prediction either at a time corresponding to a beginning of the outage, or at a time prior to (e.g. just prior to, immediately before) the beginning of the outage. Alternatively, in some embodiments the action may be performed substantially at a time corresponding to (i.e. synchronous with) the beginning of the outage, although such an action may still be scheduled in advance. Some actions may be performed a particular amount of time prior to the outage beginning, where that particular amount of time (time interval) is set as appropriate for the action. For example, if the action is to notify a user of an upcoming outage, the action may be taken in time for the user to plan for the outage, or to refrain from beginning an activity that will be interrupted by the outage, due to an expected duration of the activity. If the action is to power down or reconfigure a piece of equipment or prepare for such a power down or reconfiguration, the action may be taken sufficiently in advance of the outage that it can be reliably completed prior to (e.g. just prior to) the beginning of the outage. Or, the action can be taken at or even after the beginning of the outage, if power usage is less of a concern than network uptime. In some embodiments, the action is performed at a time which is a first amount of time (i.e. a first time interval) prior to the beginning of the outage. In such a case, the action may include inhibiting start of one or more operations which require a duration for completion which is greater than the first time interval.

There are a variety of types of actions which can be performed in accordance with embodiments of the present disclosure. For example, actions can be taken which improve communication network operations or efficiency, or which improve user experience, or a combination thereof. Actions can be taken which limit problems or inefficiencies which are caused due to backhaul outages. Actions can be taken which directly or indirectly inhibit operations (e.g. communication attempts) which would require the backhaul when the backhaul is in an outage state. Actions can be taken to notify other devices of a backhaul outage or restoration, or timing thereof.

Actions can be taken which cause a change to a device's user interface, such as a graphical display or audio output, or user interface outputs. Actions can be taken which cause a change to a component of the device, such as a power management module, radio module or associated communication management module. Examples of actions, commensurate with the above, include suspending communication operations by one or more devices; powering down communication equipment of the core network; powering down part or all of a providing a relevant part of the core network, for example which supports a remote radio access network; scheduling a power down, power up, or other operation, and configuring a sleep/wake schedule of a device; or reconfiguring a device. Suspending of communication operations can be done in a proactive and orderly manner. For example, the suspension can involve a controlled shut down, detachment procedures, etc. The suspension can involve messaging between communicating entities indicative of the suspension, for example transmitting notifications of the suspension, and where applicable acknowledgements. The suspension can involve communicating when the suspension will begin, end, or both, and how the beginning, end, or both of the suspension will occur. Reconfiguring a device can include migrating software from one server to another, or configuring a device to reply that certain functionalities are unavailable or subject to congestion or delay due to a backhaul outage.

In various embodiments, an action can include transmitting a notification. In other embodiments, an action may include adjusting some device operation in response to receipt of such a notification. A notification may be an instruction to perform an action. A notification may be a warning, in response to which an action can be taken if a local determination is made to do so. An action can include producing (e.g. generating and transmitting) a notification of an outage or an end of an outage. The notification may include the predicted start time, end time, or both, of the outage. The notification may be directed toward a user, for example in the form of a graphical display change on a device. The graphical display change can include the display of a particular icon on the device's screen. The notification may be wirelessly transmitted toward a device (e.g. UE or Internet device). The notification may be transmitted to a device in the packet core or in an adjacent network such as the Internet via an available wired, wireless or optical communication link. In some embodiments, the notification may be produced at a time prior to the beginning of the outage and may indicate the predicted future beginning time of the outage. In some embodiments, the notification indicates a predicted future end time of the outage.

Figure 4:
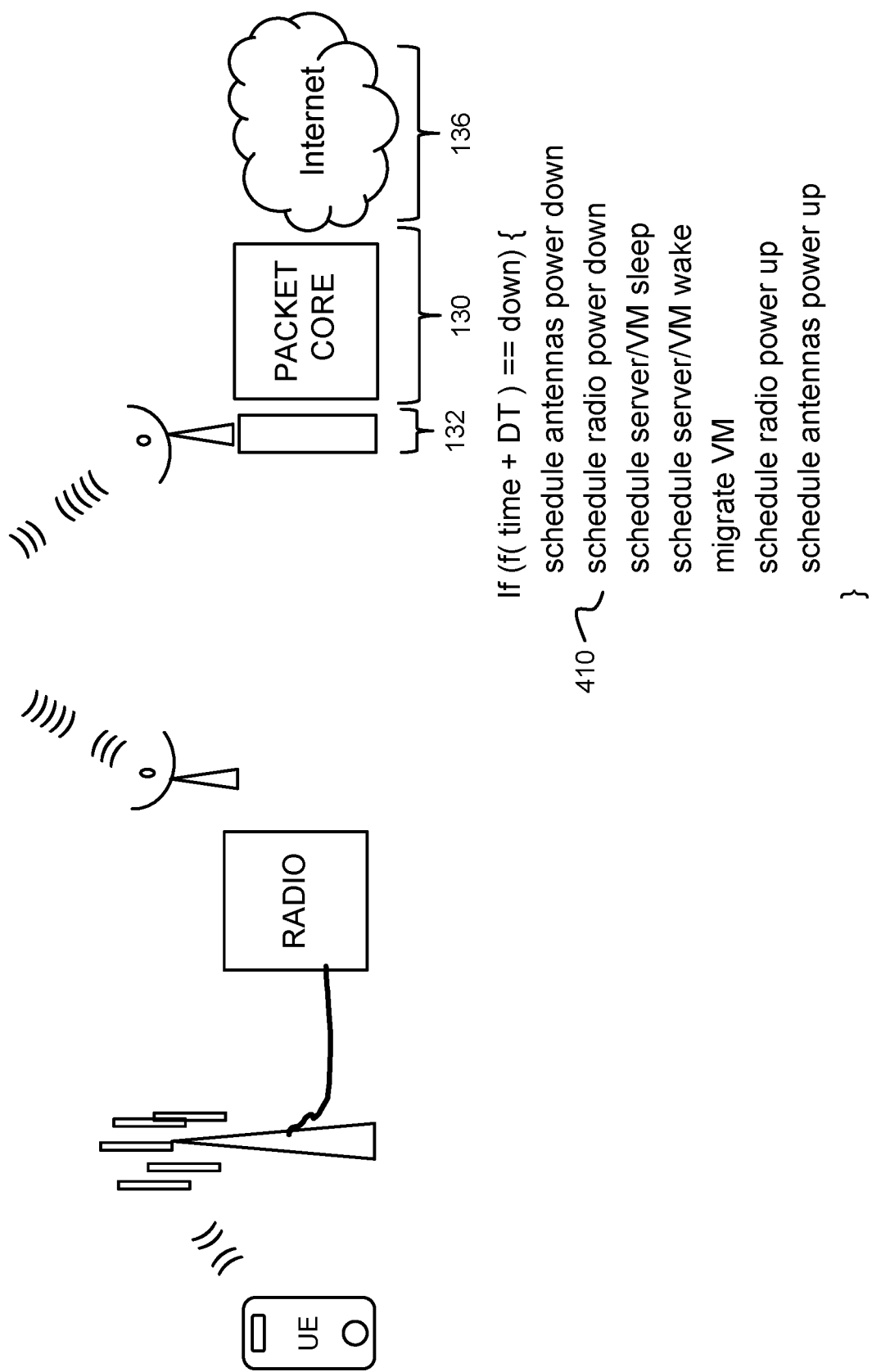
FIG. 4 illustrates a communication network scheduling an infrastructure power down, power up, sleep or wake action in response to a predicted future satellite backhaul state change, according to an embodiment of the present disclosure.

In some embodiments, as illustrated in FIG. 4, an action 410 can be taken by or toward a device belonging to the core network 130 or an adjacent ground station device 132 as follows. In particular, if an outage state (i.e. "down") is predicted at a time which is DT time units in the future, the action may comprise scheduling a power down operation for one or more devices belonging to the core network or ground station, or portions of such devices. The power down operation can be scheduled for a time substantially coinciding with, or in advance of, the time of the predicted outage. For example, power down operations may be scheduled for one or more antennas, or one or more radios, or one or more related pieces of equipment of the ground station. Such antennas or radios may be involved with backhaul communication. An antenna may be powered up or down for example with respect to active analog circuitry for increasing signal strength, ice-melting heaters, stabilizing motors, etc. Thus, power up and down operations can be performed for antennas and co-located related equipment. Power down operations for other devices belonging to the core network 130 may be performed similarly. Scheduling of power up operations, as will be described elsewhere herein, is also illustrated.

Power down operations for devices belonging to the core network can be sleep operations, and the corresponding power up operations for such devices can be wake operations. For example, a server, or components thereof, which functions only for supporting the remote radio access network or communication with the remote radio access network (being the radio access network which will be unreachable due to the backhaul outage), can be put into a sleep state for the duration of the outage and then subsequently wakened from the sleep state. Components of a server can include processor units, memory units, network interface units, etc. for example located in a datacenter and operating together to instantiate a server. As another example, virtual machines or virtual network functions operating on a server, which function (e.g. only) for supporting the remote radio access network or communication with the remote radio access network (being the radio access network which will be unreachable due to the backhaul outage), can be put into a sleep state for the duration of the outage and then subsequently wakened from the sleep state.

In some embodiments, virtual machines or virtual network functions can be migrated from one server to another in coordination with sleep or wake actions. For example, a virtual machine or virtual network function can be moved from a first server to a second server prior to powering down (putting into a sleep state) the first server. A server may partially or primarily function to support the remote radio access network (or communication with the remote radio access network) which will become unreachable due to the backhaul outage, but the server may also hold other virtual machines or other virtual network functions associated with other tasks. In this case, these other virtual machines or other virtual network functions can be migrated to another server prior to the server being put into the sleep state. In other words, functionalities of a server can be reorganized prior to putting a server (or other communication) into a sleep state or otherwise powering it down. Network function virtualization (NFV) based software, such as virtual machines and containers can be migrated in a similar manner.

Accordingly, in embodiments of the present disclosure, servers in a core data center which are associated with handling of radios that are unreachable because of a backhaul outage can be powered down, and NFV based software, VMs or software containers can be moved in association with such power downs. Subsequently, when the radios become reachable due to backhaul restoration the servers can be powered up. For example, the servers can be used to service devices that connect to the network via a remote radio access network which is temporarily out of communication with the core network due to the backhaul outage. Further migrations of functions can be performed along with or following server power-ups.

Figure 5:
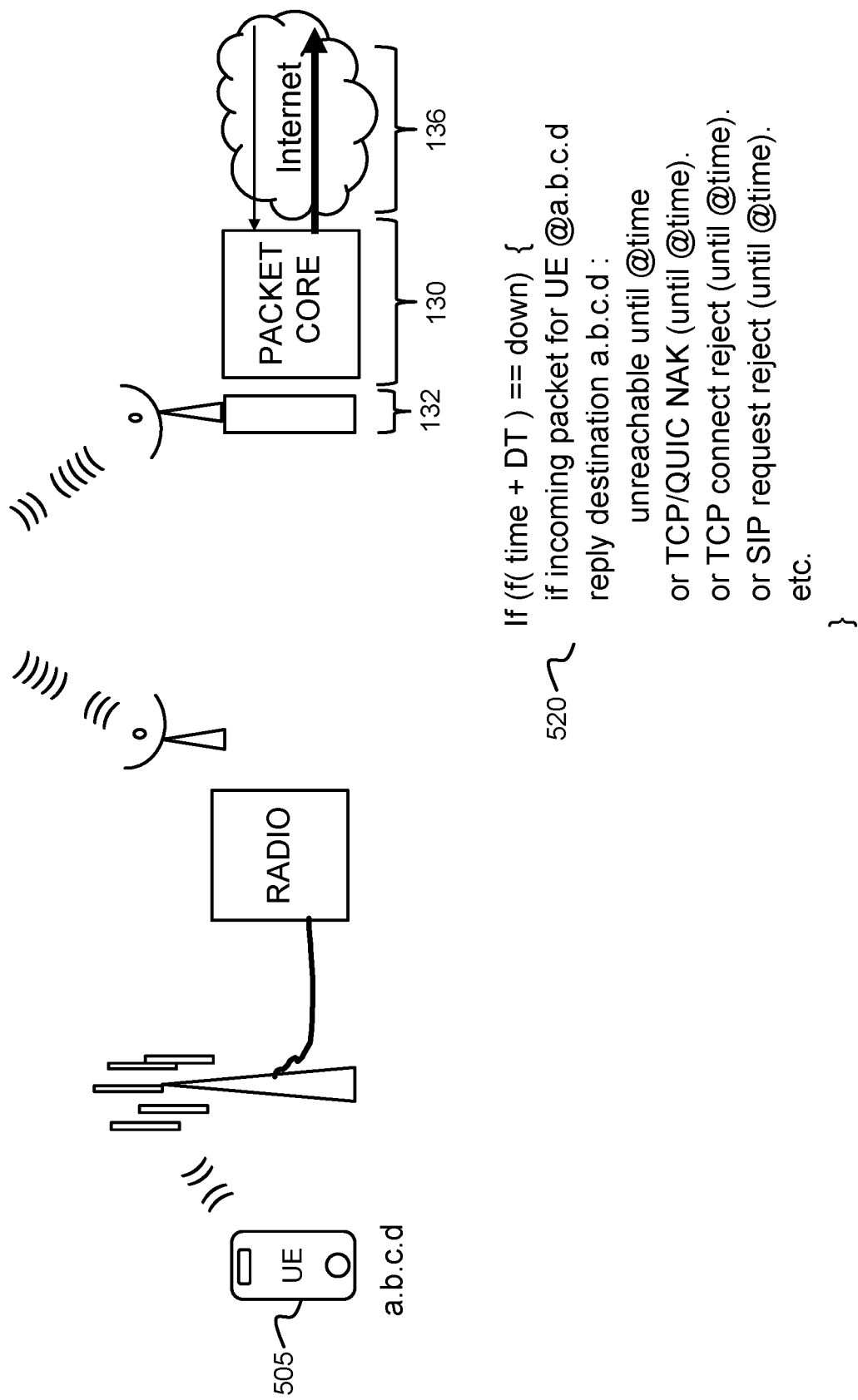
FIG. 5 illustrates a communication network configuring incoming packet reply actions, including an indication of future uptime, in response to a predicted future satellite backhaul state change, according to an embodiment of the present disclosure.

In some embodiments, as illustrated in FIG. 5, packet core gateway (PGW) messages to Internet devices can be augmented with an indication of a time when a connection to a remote device (e.g. a UE) is anticipated to be possible. In more detail, due to a backhaul outage or predicted future backhaul outage, a device 505 such as a UE having a network address a.b.c.d may be deemed unreachable via the core network 130. Consequently, the core network 130 is configured to respond to messages (packets) pertaining to network address a.b.c.d with a reply packet such as a "destination unreachable," "NAK," "reject" or similar message packet. The messages may be received at the PGW from devices in the Internet 136 or a similar network, for example. The messages may be packets to be transmitted via the backhaul link to device having address a.b.c.d or packets prompting a further communication action involving the backhaul communication link. The reply packet indicates that the backhaul communication link is unavailable, either explicitly or implicitly by indicating that the device at address a.b.c.d is unreachable. Furthermore, these reply packets may specify a time at which the backhaul communication link is expected to be available. This may be done implicitly for example by specifying when connection to the device having address a.b.c.d is expected to be possible. This is feasible because backhaul outages and endings thereof are predictable for example in a satellite network.

In more detail with respect to FIG. 5, an action 520 may include transmitting a reply packet indicating that a destination (at address a.b.c.d) is unreachable until a specified time. This reply may be in the form of a transmission control protocol (TCP) or quick user datagram protocol internet connection (QUIC) negative acknowledgement (NAK) message indicating the specified time, or a TCP connection reject message indicating the specified time, or a session initiation protocol (SIP) request reject message indicating the specified time. Such protocols and their messages are readily understood by a worker skilled in the art, however the messages can in some cases be adjusted to include further information such as the specified time at which the destination is anticipated to be reachable. This adjustment can be by adding and configuring a new field to the message, for example.

Figure 6:
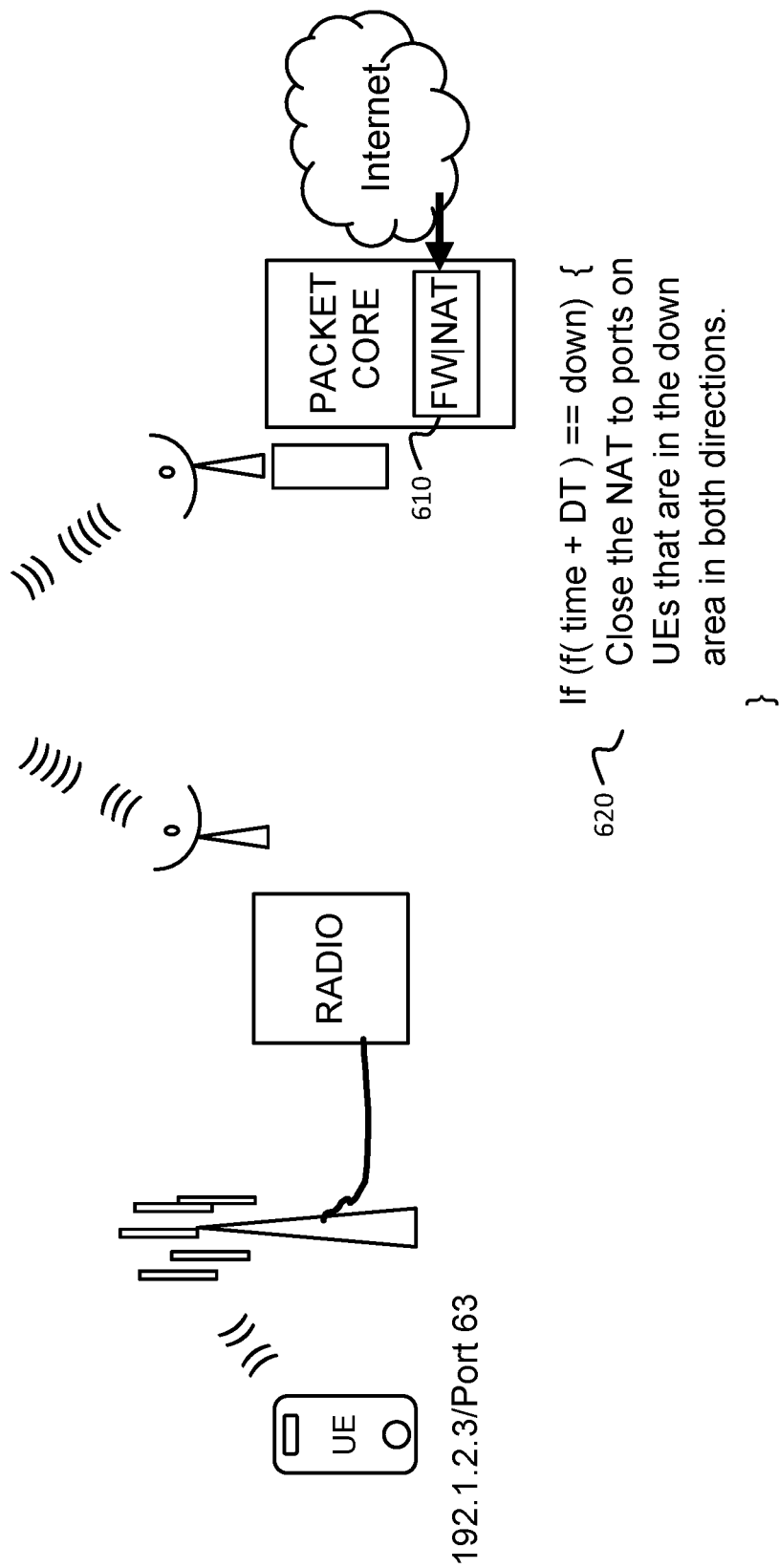
FIG. 6 illustrates a communication network taking an action to close network address translation (NAT) ports in response to a predicted future satellite backhaul state change, according to an embodiment of the present disclosure.

In some embodiments, as illustrated in FIG. 6, a Network Address Translator (NAT), Firewall (FW), or both NAT and FW changes are made as a function of time. For example, an action 620 can reconfigure the NAT or firewall 610 to close ports used for accessing devices (e.g. UEs) that are expected to be unreachable due to backhaul outages, for the duration of such backhaul outages. The ports can subsequently be reopened. The closing and reopening can be done in advance of anticipated backhaul outages and restorations, respectively. In other words, for a device belonging to the core network, the device being a NAT or a firewall device, one or more ports (e.g. TCP or UDP ports) can be closed, where such ports map to destinations accessed via the backhaul communication link which is or which is anticipated to be in outage.

Figure 7:
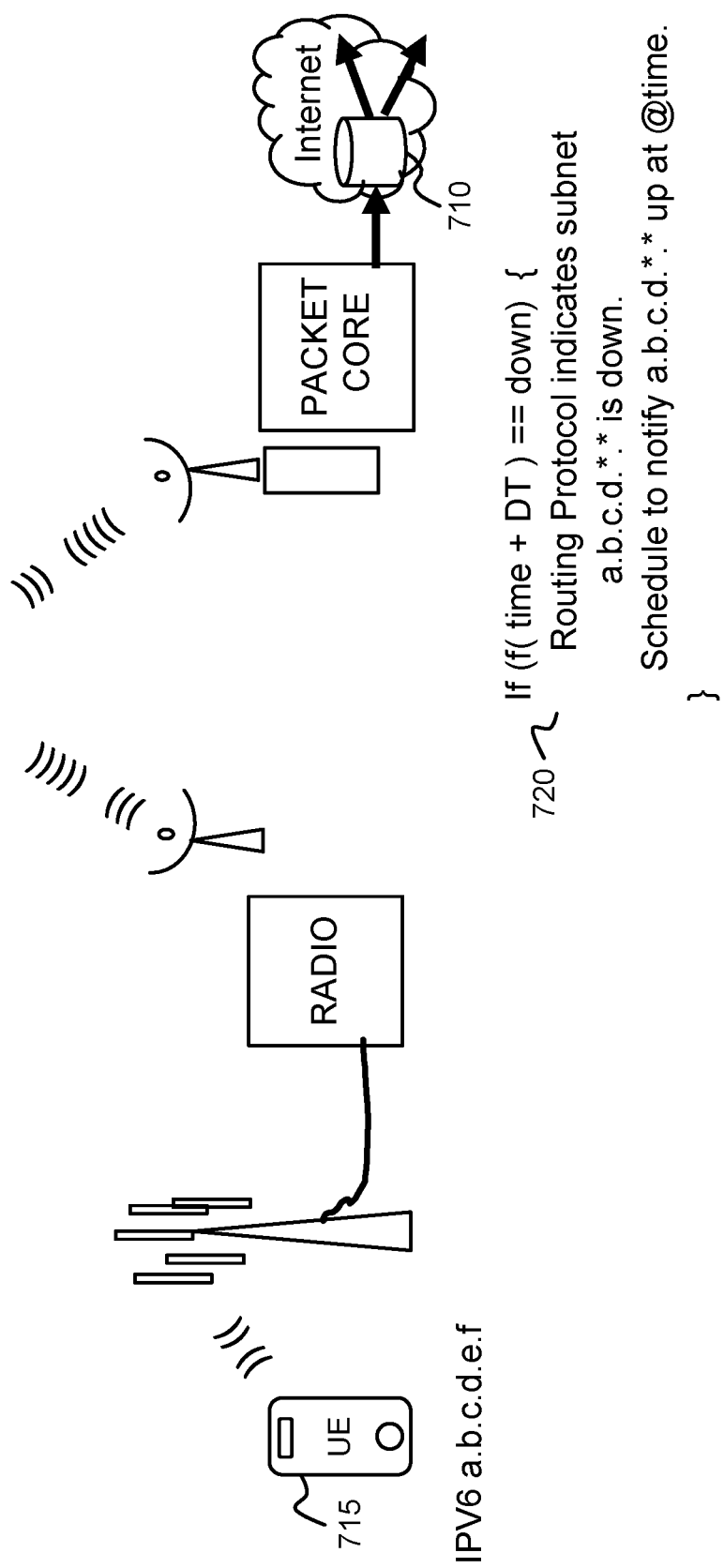
FIG. 7 illustrates a communication network taking an action to indicate that a certain subnet is down (or up) in response to a predicted future satellite backhaul state change, according to an embodiment of the present disclosure.

In some embodiments, as illustrated in FIG. 7, an action 720 can be taken by or directed toward a router 710 serving the core network. The action can include withdrawing, at the router, network addresses or subnets (groups of addresses) corresponding to destination addresses of devices in a radio access network which is (or is anticipated to be) unreachable due to backhaul outage. The withdrawn network addresses can subsequently be reinstated due to subsequent restoration (or anticipated restoration) of the backhaul link. In more detail, a Packet Core Gateway (PGW) device (e.g. router) may transmit an instruction to the router 710, which may be an internet router. The message indicates that the router 710 is to withdraw certain network addresses or subnets. For example, a device 715 accessing the communication network via a remote radio access network may have IP address a.b.c.d.e.f. The entire remote radio access network may be unreachable for a time due to a backhaul outage. The message may indicate that an entire subnet a.b.c.d, potentially encompassing multiple devices (including device 715 with address a.b.c.d.e.f) accessing the communication network via the remote radio access network, is to be withdrawn at the router 710. Embodiments may further configure the router 710 to reinstate the network addresses or subnet at a future time, at which the backhaul link outage is expected to end. This may be performed by scheduling the PGW device to transmit a further instruction to the router 710 to reinstate the previously withdrawn network addresses or subnets.

Figure 8:
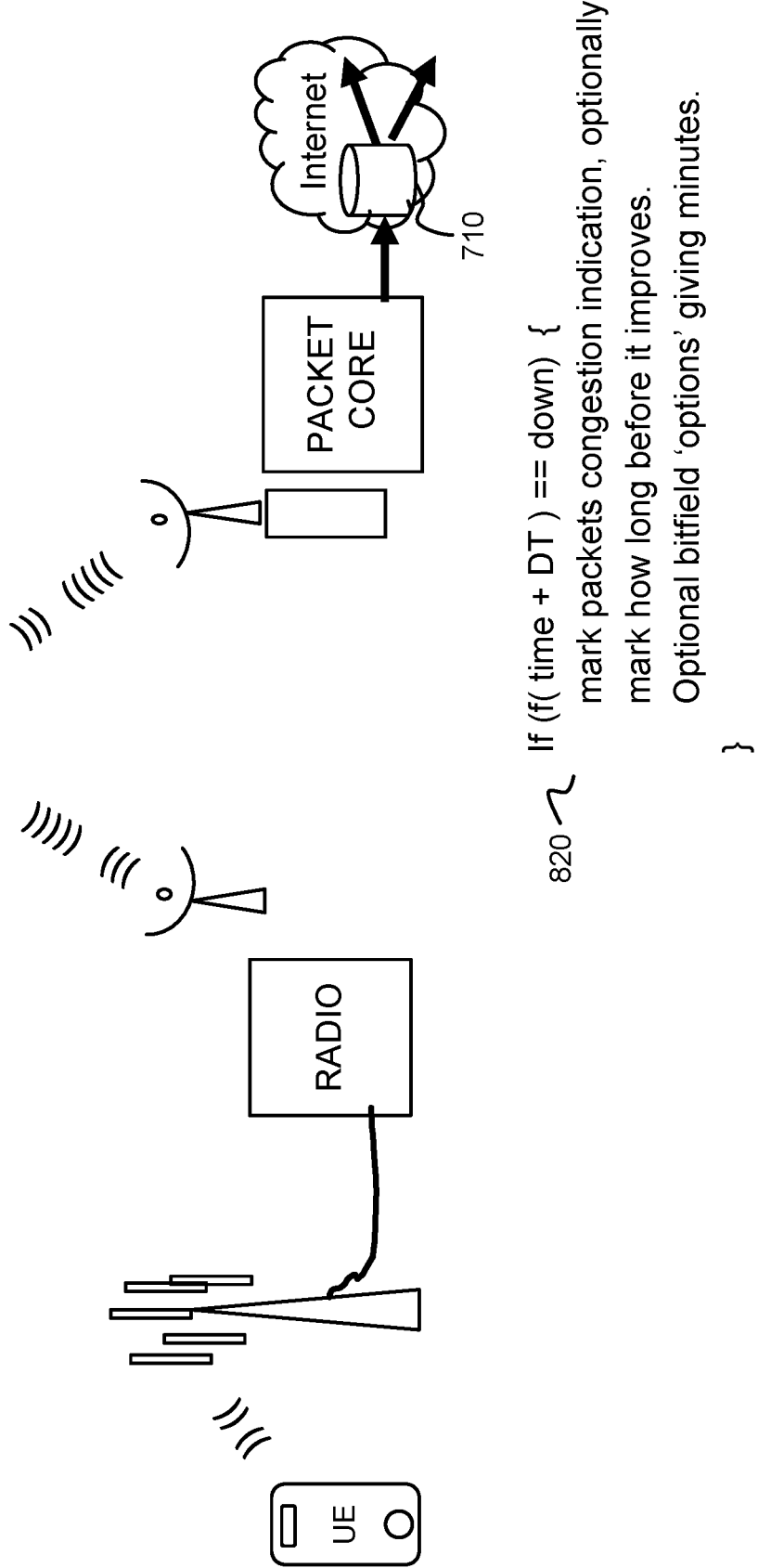
FIG. 8 illustrates a communication network taking an action to mark packets with a congestion indication (and optionally a predicted congestion end time), in response to a predicted future satellite backhaul state change, according to an embodiment of the present disclosure.

In some embodiments, as illustrated in FIG. 8, an action 820 can be taken in response to receiving a packet to be transmitted via a backhaul communication link, or prompting a further communication action involving the backhaul communication link, when the backhaul communication link is or is anticipated to be in an outage state. The action 820 can include marking the packet with a congestion indication. Marking packets with congestion indications can be performed similarly to a standard manner as known in the art. However, in this case the packet may be marked with the congestion indication not in response to conventionally observed congestion factors (such as delays or router queue sizes), but rather in response to an anticipated backhaul link outage, where the packet is addressed so that it would typically traverse the backhaul link. Furthermore, in some embodiments, the congestion indication can include an indication of an expected future time at which the backhaul link is expected to become available (and hence the congestion relieved). Such an indication is possible due to the predictability of backhaul outage endings. As will be readily understood, applications are generally configured to back off packet transmissions in response to congestion indications. These applications can be further configured to increase packet transmissions again at the indicated future time. Because applications are caused to back off (e.g. reduce packet transmission rates), the application is given more time to react in a controlled manner to a predicted future backhaul outage. This can be preferable to an abrupt outage.

In some embodiments, a bit field may be included in the packet (marked with the congestion indication) to indicate the amount of time, e.g. in number of minutes, before the backhaul outage is expected to end and thus congestion is expected to improve. Or else, the bit field may indicate the absolute time when the backhaul outage is expected to end. Additionally or alternatively, time stamps indicating when the outage began (or is anticipated to begin), when the outage is anticipated to end, or both, can be included.

In some embodiments, the congestion indication indicates one or more expected future states of the backhaul link, at one or more corresponding expected future times. For example, the congestion indication may include an indication of a time at which the backhaul communication link is expected to be unavailable, available again after being unavailable, or a combination thereof. The congestion indication may include an indication that, at a specified future time, the backhaul state is anticipated to be different than it is at the present time, or than it is at another specified future time. The congestion indication is typically useful when packets are flowing, because otherwise there may be no packets to mark with the congestion indication. Hence the congestion indication may be marked into packets prior to an outage, but can indicate the anticipated future time at which the outage is expected to occur or at which the outage is expected to resolve, or both.

In some embodiments, the action can include transmitting a notification of the (e.g. anticipated future) backhaul outage toward a user or toward a device. This user or device accesses (or attempts to access) the remote radio access portion of the communication network via the core network, where the remote radio access portion is connected to the core via the backhaul. The notification may be produced prior to the beginning of the backhaul outage and indicates the beginning time of the outage. The user or device may be communicating with a device served by the remote radio access portion for example. Thus, the user or device can be notified of an anticipated future outage and may take appropriate actions.

For example, for a UE device having a user interface graphical display, an icon or message can be displayed indicating that the amount of time until (or the absolute time of) a predicted outage beginning or associated scheduled power down operation, a predicted outage end or associated scheduled power up operation, or both. As another example, the action can include inhibiting certain activities for a certain period of time in advance of a predicted outage, or providing a warning regarding such activities. For example, if the backhaul is predicted to be down starting in a certain amount of time from now, then downloads which would take longer than that amount of time can be prevented. A warning can be issued that an outage is expected to occur at a specified time, which may be an absolute time or an amount of time after the present time (e.g. "in 30 seconds"). Activities, such as data downloads or uploads that require more time than is available before the predicted outage begins, can be inhibited from occurring, or a warning can be issued that such activities likely cannot be completed in time prior to the outage beginning. Warnings to users can be useful in allowing the user to prepare for the outage, for example by ending a call and scheduling a subsequent call. Warnings to devices can be used to trigger the devices to automatically perform operations in preparation for the outage.

Although the above embodiments focus primarily on actions taken due to a predicted backhaul outage, in various embodiments, an action can be taken due to an end or predicted end of a backhaul outage. An action, such as a power up operation, can be scheduled for one or more devices, such as those devices mentioned above as being powered down due to a backhaul outage. The power up operation can be scheduled to substantially coincide with, or be advance of, a predicted time at which an outage is expected to end. A device which is powered down at or in anticipation of an outage can be powered up at or in anticipation of an end of the outage, and vice-versa. A router, NAT or firewall which has addresses withdrawn or ports closed can have these addresses reinstated or ports reopened. Servers or virtual machines or network functions can be awakened. Power up operations can be scheduled separately or along with power down operations. Indications of the expected time that an outage is ending can be provided to devices and users.

More generally, embodiments of the present disclosure include determining a predicted future end time of a present or predicted future outage. The predicted future end time can be obtained from the same source as the predicted outage start time. Such embodiments further include, in response to the determination of the predicted future end time, scheduling or performing an action at a core network device, an adjacent ground station device, or an adjacent (e.g. Internet-based) device, each being as described above, or a combination thereof. The action can be performed at or in advance of the predicted future end time of the outage. Such embodiments may also involve performing an action related to the beginning of a predicted outage.

Actions taken at or advance of a predicted end time of a backhaul outage can be as follows. Actions can include resuming suspended communication operations; powering up previously powered down equipment of the core portion; powering up previously powered down other equipment of the core portion (such other equipment being used to communicate with the remote radio access portion), or a combination thereof. Actions can include producing a notification of an end of the outage, where the notification is directed toward a user or toward a device accessing the communication network. Actions can similarly include producing a notification of the predicted end time, where the notification is directed toward the user or toward the device accessing the communication network. Actions can include transmitting a notification of an end of the outage, where the notification is directed toward a user or toward a device accessing the remote radio access portion of the communication network via the core network. Actions can include reopening one or more previously closed ports of the device belonging to the core portion of the communication network, where the device acts as a NAT or a firewall and the ports map to destinations accessed via the backhaul communication link. Actions can include reinstating, at the device acting as a router within or adjacent to the core portion, one or more previously withdrawn network addresses or subnets corresponding to destinations accessed via the backhaul communication link. Actions can include migrating virtual machines or functions. Actions can include scheduling one of the aforementioned or another action, or the like, or a combination thereof. In general, such actions taken at or in advance of the end of an outage can partially or fully reverse actions taken at or in advance of the beginning of the outage.

Figure 9:
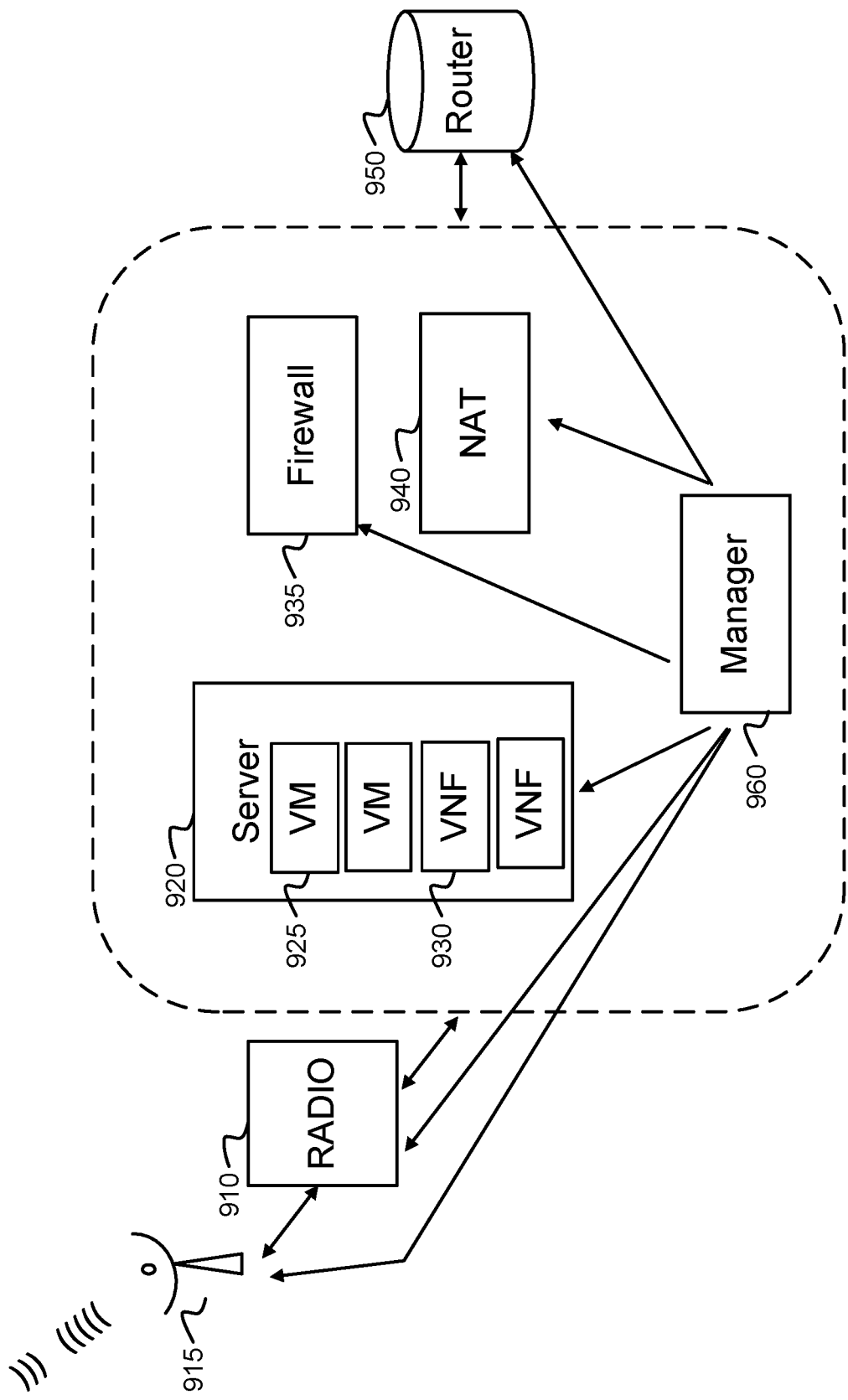
FIG. 9 illustrates components within or operatively coupled to a packet core, according to embodiments of the present disclosure.

FIG. 9 illustrates components within or operatively coupled to a core network, according to embodiments of the present disclosure. The components may include a backhaul radio 910 and an antenna device 915, which may be part of a ground station. The backhaul radio and the antenna device can be used to communicate with one or more satellites forming a backhaul network. The components may include at least one server 920 which can host one or more virtual machines 925, one or more virtual network functions 930, or a combination thereof. The components may include a firewall 935 and a NAT 940. The components 920, 935, 940 can be instantiated using one or more devices in a data center. The components 920, 925, 930, 935, 940 can be part of a core network. Other components such as routers, SGW, and other network functions and supporting devices of a core network as would readily be understood by a worker skilled in the art can also be included, either as virtual network functions or dedicated electronic communication devices. The components can include a router 950, for example in an adjacent network such as the Internet. The components 910, 915, 920, 925, 930, 935, 940, 950 can be managed by a manager 960, which can include a computer. The manager can instruct the components to operate as described herein in response to an anticipated backhaul outage or anticipated end of a backhaul outage. The manager may operate fore example as described in FIG. 10 and may be configured for example as described in FIG. 11.

Figure 10:
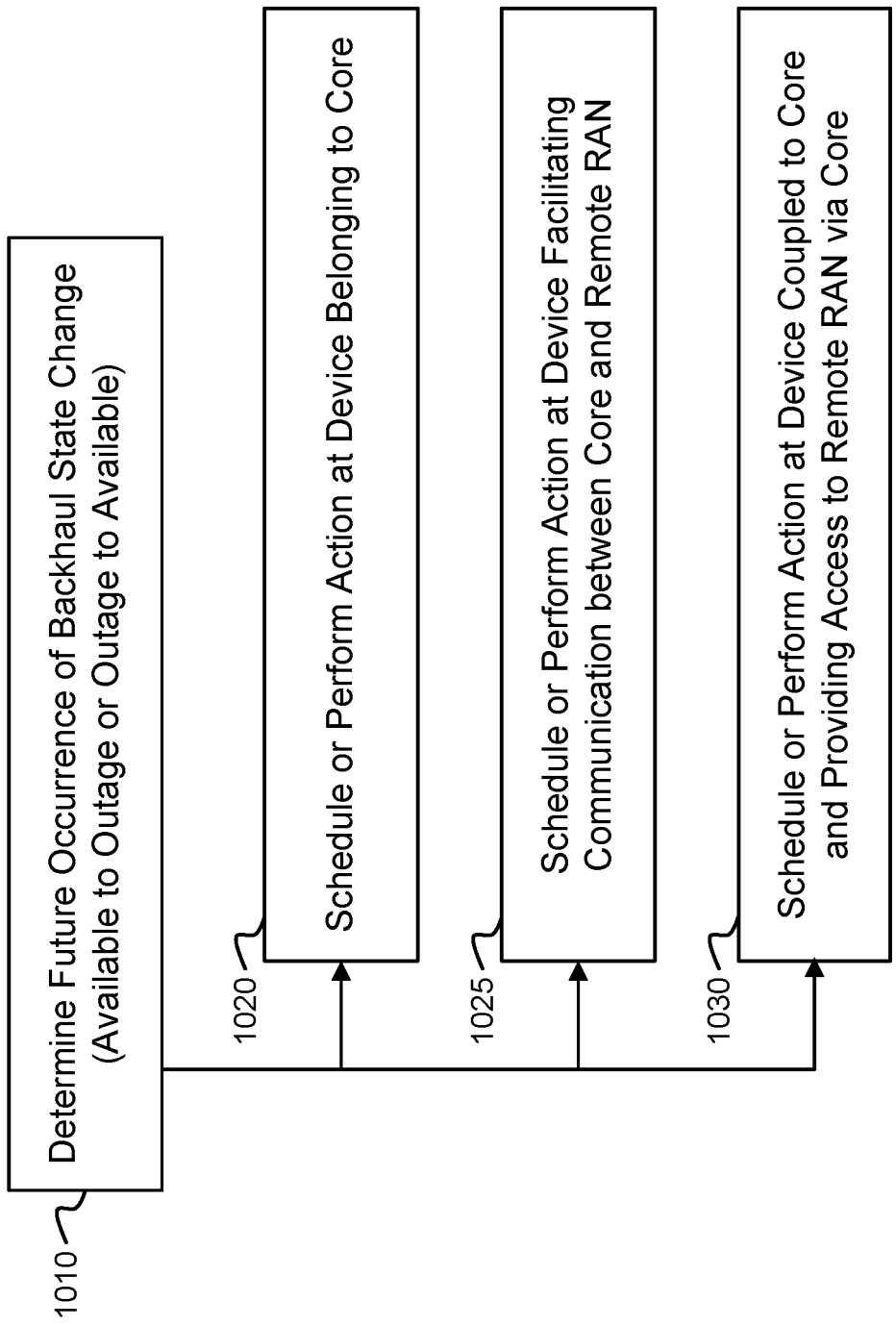
FIG. 10 illustrates a method provided in accordance with embodiments of the present disclosure.

FIG. 10 illustrates a method performed in accordance with an embodiment of the present disclosure, as described above. The method includes determining 1010 a future occurrence of a backhaul state change. The state change can be a change from the backhaul being in an available, operational state to the backhaul being in an outage state. The state change can be a change from the backhaul being in an outage state to the backhaul being in an available, operational state. The determination can involve making a prediction based on a geographic location and satellite constellation data. The determination can involve receiving a prediction from an external entity which makes the prediction. The method further involves scheduling or performing 1020 an action at a device 1020 belonging to the core portion of the communication network and communicating with the remote radio access portion, such as a device in a datacenter. a device which facilitates communication between the core network and the remote radio access portion, such as a ground station or portion thereof. The method additionally or alternatively involves scheduling or performing 1030 an action at a device coupled to the core portion and providing access to the remote radio access portion via the core portion, such as an Internet router.

Figure 11:
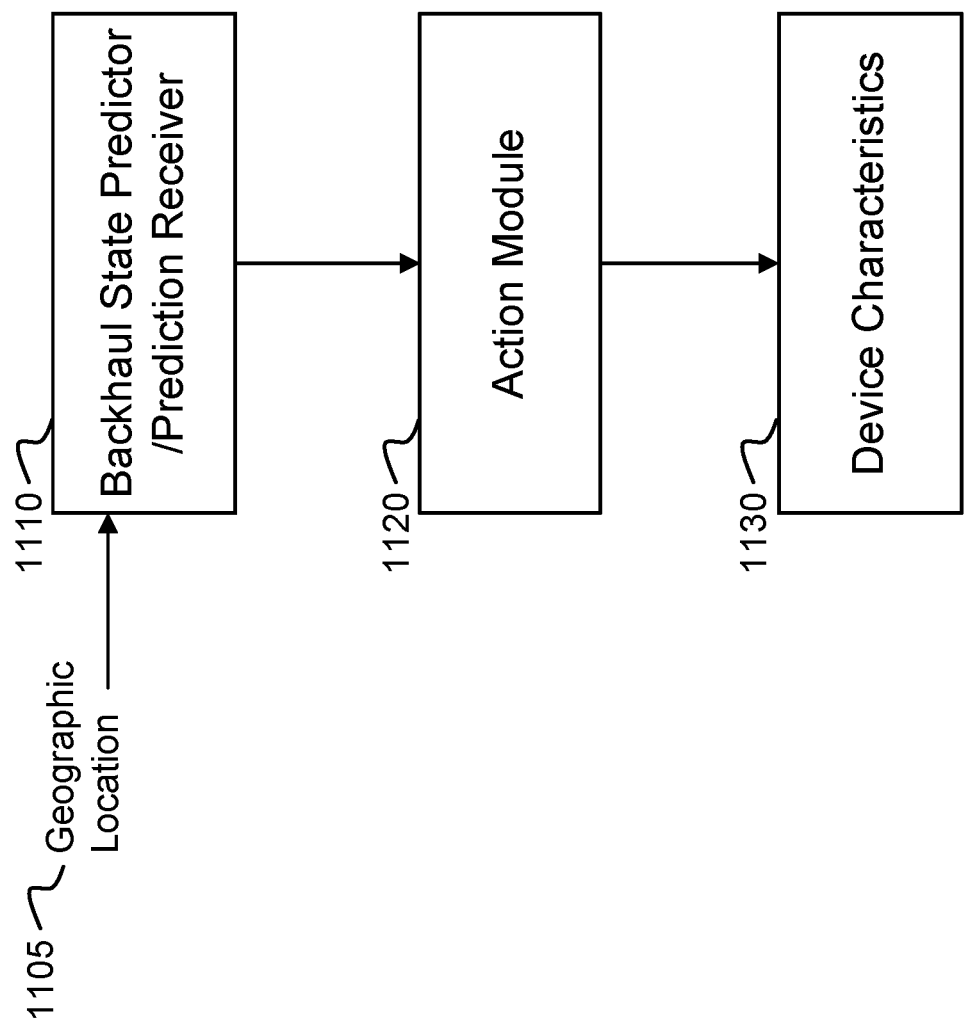
FIG. 11 illustrates an apparatus provided in accordance with embodiments of the present disclosure.
Figure 12:
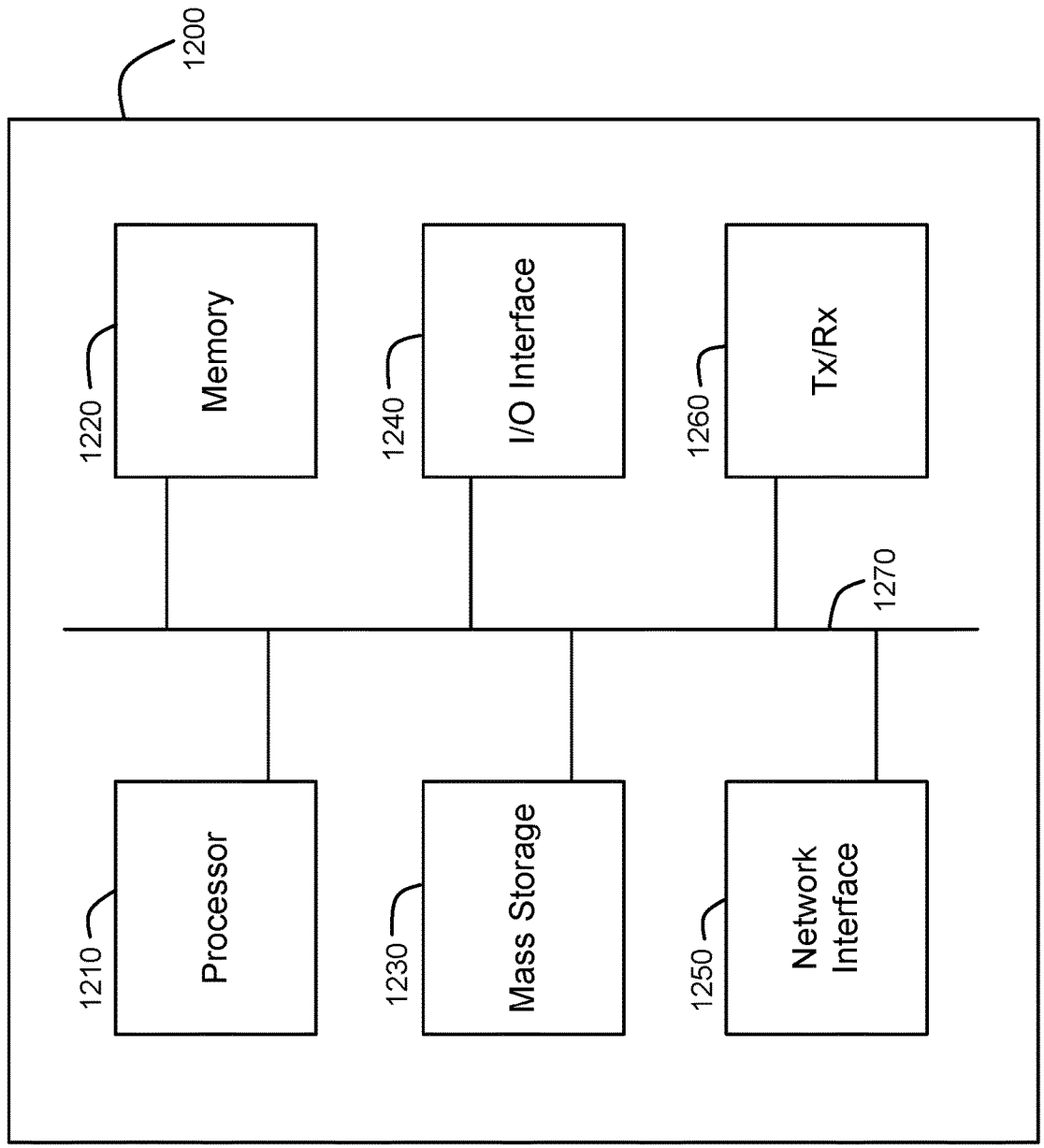
FIG. 12 is a schematic diagram of an electronic device, according to embodiments of the present disclosure.

FIG. 11 illustrates functional aspects of an electronic device (e.g. manager device), in accordance with embodiments of the present disclosure. Such functional aspects can be provided by an electronic device, such as illustrated in FIG. 12, by execution of appropriate computer program instructions stored in memory. Alternatively, dedicated electronic hardware or firmware may be provided which, when implemented, causes the electronic device to exhibit the functional aspects. A backhaul state predictor or backhaul state prediction receiver 1110 makes or receives predictions as to the future state of the satellite backhaul. This can be based at least in part on the geographic location 1105 of the electronic device, geographic location of an associated remote RAN, or a combination thereof. The prediction can include a set of times at which the backhaul changes between available and outage states, or equivalently a continuum of times with indications, for each time, as to what state the backhaul is in. The predictions can be based on the geographic location information and information regarding orbital position of satellites capable of providing the backhaul or access to the backhaul network. The predictions can further be based on reported information indicative of states of satellites, e.g. as being either in an active or non-active state with respect to being able to communicate with ground in such a capacity as to provide a backhaul link. The action module 1120 causes the device to perform one or more actions based on output of the predictor/prediction receiver 1110, at one or more times which are based on times supplied by the predictor/prediction receiver 1110. For example, the action module can cause the device to transmit a message (notification or instruction), or perform a power down or sleep operation, or perform a power up or wake operation, or perform a reconfiguration or migration operation, or provide a user notification. Such actions can be taken substantially at the time of a predicted backhaul state change, or a suitable time prior to such a backhaul state change. The amount of time between the action and the state change can depend on the action and operational requirements. For example, notifying a user or device of an upcoming outage can be performed several minutes in advance of the outage, in order to provide the user with adequate notice. Device characteristics 1130 such as user display characteristics, messaging behaviour, attachment behaviour, module power up/down status, sleep/wake status, etc. can be influenced by the action module 1120.

FIG. 12 is a schematic diagram of an electronic device 1200 that may perform any or all of the steps of the above methods and features described herein, according to different embodiments of the present disclosure. For example, network infrastructure devices, end-user computers, smartphones, IoT devices, laptops, tablet personal computers, electronic book readers, gaming machine, media players, devices performing tasks in relation to graphical display, physical machines or servers, or other computing devices can be configured as the electronic device.

As shown, the device includes a processor 1210, such as a Central Processing Unit (CPU) or specialized processors such as a Graphics Processing Unit (GPU) or other such processor unit, memory 1220, non-transitory mass storage 1230, I/O interface 1240, network interface 1250, and a transceiver 1260, all of which are communicatively coupled via bi-directional bus 1270. According to certain embodiments, any or all of the depicted elements may be utilized, or only a subset of the elements. Further, the device 1200 may contain multiple instances of certain elements, such as multiple processors, memories, or transceivers. Also, elements of the hardware device may be directly coupled to other elements without the bi-directional bus.

The memory 1220 may include any type of non-transitory memory such as static random access memory (SRAM), dynamic random access memory (DRAM), synchronous DRAM (SDRAM), read-only memory (ROM), any combination of such, or the like. The mass storage element 1230 may include any type of non-transitory storage device, such as a solid state drive, hard disk drive, a magnetic disk drive, an optical disk drive, USB drive, or any computer program product configured to store data and machine executable program code. According to certain embodiments, the memory 1220 or mass storage 1230 may have recorded thereon statements and instructions executable by the processor 1210 for performing any of the aforementioned method steps described above.

Potential advantages of embodiments of the present disclosure include reducing the cost of satellite constellations by making networks more tolerant to outages. That is, satellite constellations can be deployed with less redundancy due to the increased outage tolerance. Coverage costs can increase non-linearly to full coverage. Because outages are predictable, users can be warned of upcoming outages which potentially improves user experience. Energy can be conserved due to the anticipation of outages and proactive powering down of equipment and suspension of communication operations. Spectral efficiency is similarly improved.

As described above, various responses to backhaul outages are described. In some embodiments, such backhaul outages correspond to a complete interruption of a communication link. However, in other embodiments, such backhaul outages correspond to a partial interruption of a communication link. For example, the bandwidth of a backhaul link between a remote radio access network and a core network can be reduced but the link can be still maintained. This can occur for example when a satellite service interruption is experienced, but another link, e.g. a terrestrial link or another satellite link is maintained. This can still be considered an outage due to the reduction of available bandwidth.

It will be appreciated that, although specific embodiments of the technology have been described herein for purposes of illustration, various modifications may be made without departing from the scope of the technology. The specification and drawings are, accordingly, to be regarded simply as an illustration of the disclosure as defined by the appended claims, and are contemplated to cover any and all modifications, variations, combinations or equivalents that fall within the scope of the present disclosure. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method comprising:
   determining a predicted occurrence of an outage in a satellite backhaul communication link provided at least in part by one or more satellites, said outage occurring at a future time corresponding to a beginning of the outage and being predictable at least in part according to orbital positions of the one or more satellites, said outage interrupting communication between a core portion of a communication network and a remote radio access portion of the communication network, said outage having a predicted future end time corresponding to restoration of the communication between the core portion of the communication network and the remote radio access portion of the communication network; and
   in response to said determining the predicted occurrence of the outage, scheduling or performing an action at one or more of:
      a device belonging to the core portion of the communication network and communicating with the remote radio access portion, wherein the device belonging to the core portion of the communication network being a network address translator (NAT) or a firewall;
      a device which facilitates communication between the core network and the remote radio access portion; and
      a device coupled to the core portion and providing access to the remote radio access portion via the core portion,
   the action being performed at the future time corresponding to the beginning of the outage or at a time prior to the beginning of the outage, the action comprising closing one or more TCP or UDP ports of the device belonging to the core portion of the communication network, said ports mapping to destinations accessed via the backhaul communication link.

2. The method of claim 1, wherein the action comprises one or more of: suspending communication operations; powering down equipment of the core portion, said equipment being used to communicate with the remote radio access portion; and moving virtual network functions from said equipment prior to powering down said communication equipment.

3. The method of claim 1, wherein the action comprises, in response to receiving a packet to be transmitted via the backhaul communication link or prompting a further communication action involving the backhaul communication link, transmitting a reply packet toward a device sending the packet, the reply packet indicative that the backhaul communication link is unavailable and specifying the future end time at which the backhaul communication link is expected to be available.

4. The method of claim 1, wherein the action comprises, in response to receiving a packet to be transmitted via the backhaul communication link or prompting a further communication action involving the backhaul communication link, marking the packet with a congestion indication.

5. The method of claim 4, wherein the congestion indication includes an indication of the future time at which the backhaul communication link is expected to be unavailable, the predicted future end time at which the backhaul communication link is expected to be available again after being unavailable, or a combination thereof.

6. The method of claim 1, wherein the device is a router serving the core portion, and wherein the action comprises withdrawing one or more network addresses or subnets corresponding to the destinations accessed via the backhaul communication link.

7. The method of claim 1, wherein the action comprises transmitting a notification of the outage, the notification being directed toward a user or toward a device accessing the remote radio access portion of the communication network via the core network, and wherein the notification is produced at the time prior to the beginning of the outage and indicates the future time corresponding to the beginning of the outage.

8. The method of claim 1, further comprising:
   determining the predicted future end time of the outage; and
   in response to said determining the predicted future end time of the outage, scheduling or performing a further action at one or more of: the device belonging to the core portion of the communication network; the device which facilitates communication between the core network and the remote radio access portion; and the device coupled to the core portion, the further action being performed at or in advance of the predicted future end time.

9. The method of claim 8, wherein the further action comprises one or more of: resuming suspended communication operations; powering up previously powered down equipment of the core portion; and powering up previously powered down other equipment of the core portion wherein said other equipment is used to communicate with the remote radio access portion.

10. The method of claim 8, wherein the further action comprises one or more of: producing a notification of an end of the outage, the notification being directed toward a user or toward the device accessing the communication network; producing a notification of the predicted future end time, the notification being directed toward the user or toward the device accessing the communication network; and transmitting a notification of an end of the outage, the notification being directed toward a user or toward a device accessing the remote radio access portion of the communication network via the core network.

11. The method of claim 8, wherein the further action comprises one or more of: reopening the one or more TCP or UDP ports of the device belonging to the core portion of the communication network; and reinstating, at the device acting as a router within or adjacent to the core portion, one or more previously withdrawn network addresses or subnets corresponding to the destinations accessed via the backhaul communication link.

12. An apparatus comprising a computer processor, a memory and a communication interface and configured to:
 determine a predicted occurrence of an outage in a satellite backhaul communication link provided at least in part by one or more satellites, said outage occurring at a future time corresponding to a beginning of the outage and being predictable at least in part according to orbital positions of the one or more satellites, said outage interrupting communication between a core portion of a communication network and a remote radio access portion of the communication network, said outage having a predicted future end time corresponding to restoration of the communication between the core portion of the communication network and the remote radio access portion of the communication network; and
 in response to said determining the predicted occurrence of the outage, schedule or perform an action at one or more of:
  a device belonging to the core portion of the communication network and communicating with the remote radio access portion, the device belonging to the core portion of the communication network being a network address translator (NAT) or a firewall;
  a device which facilitates communication between the core network and the remote radio access portion; and
  a device coupled to the core portion and providing access to the remote radio access portion via the core portion,
 the action being performed at the future time corresponding to the beginning of the outage or at a time prior to the beginning of the outage, the action comprising closing one or more TCP or UDP ports of the device belonging to the core portion of the communication network, said ports mapping to destinations accessed via the backhaul communication link.

13. The apparatus of claim 12, wherein the action comprises one or more of: suspending communication operations; powering down equipment of the core portion, said equipment being used to communicate with the remote radio access portion; and moving virtual network functions from said equipment prior to powering down said communication equipment.

14. The apparatus of claim 12, wherein the action comprises, in response to receiving a packet to be transmitted via the backhaul communication link or prompting a further communication action involving the backhaul communication link, transmitting a reply packet toward a device sending the packet, the reply packet indicative that the backhaul communication link is unavailable and specifying the future end time at which the backhaul communication link is expected to be available.

15. The apparatus of claim 12, wherein the action comprises, in response to receiving a packet to be transmitted via the backhaul communication link or prompting a further communication action involving the backhaul communication link, marking the packet with a congestion indication.

16. The apparatus of claim 15, wherein the congestion indication includes an indication of the future time at which the backhaul communication link is expected to be unavailable, the predicted future end time at which the backhaul communication link is expected to be available again after being unavailable, or a combination thereof.

17. The apparatus of claim 12, wherein the device is a router serving the core portion, and wherein the action comprises withdrawing one or more network addresses or subnets corresponding to the destinations accessed via the backhaul communication link.

18. The apparatus of claim 12, wherein the action comprises transmitting a notification of the outage, the notification being directed toward a user or toward a device accessing the remote radio access portion of the communication network via the core network, and wherein the notification is produced at the time prior to the beginning of the outage and indicates the future time corresponding to the beginning of the outage.

19. The apparatus of claim 12, further configured to:
 determine the predicted future end time of the outage; and
 in response to said determining the predicted future end time of the outage, schedule or perform a further action at one or more of: the device belonging to the core portion of the communication network; the device which facilitates communication between the core network and the remote radio access portion; and the device coupled to the core portion, the further action being performed at or in advance of the predicted future end time.

20. The apparatus of claim 19, wherein the further action comprises one or more of: resuming suspended communication operations; powering up previously powered down equipment of the core portion; powering up previously powered down other equipment of the core portion wherein said other equipment is used to communicate with the remote radio access portion; producing a notification of an end of the outage, the notification being directed toward a user or toward the device accessing the communication network; producing a notification of the predicted future end time, the notification being directed toward the user or toward the device accessing the communication network;

transmitting a notification of an end of the outage, the notification being directed toward a user or toward a device accessing the remote radio access portion of the communication network via the core network; reopening the one or more TCP or UDP ports of the device belonging to the core portion of the communication network; and reinstating, at the device acting as a router within or adjacent to the core portion, one or more previously withdrawn network addresses or subnets corresponding to the destinations accessed via the backhaul communication link.

* * * * *